United States Patent [19]

Reis et al.

[11] Patent Number: 5,269,474
[45] Date of Patent: Dec. 14, 1993

[54] EQUIPMENT FOR CONTINUOUS CHOPPING OF MUNICIPAL REFUSE AND OTHER SOLID WASTES IN GENERAL

[76] Inventors: Gianluigi Reis, Via Vettabbia,6,I20122, Milano; Giorgio Massocco, Salita Sant'Anna,97,I-15033, Casal Monferrato, both of Italy

[21] Appl. No.: 838,758
[22] PCT Filed: Jun. 10, 1991
[86] PCT No.: PCT/IT91/00048
§ 371 Date: Apr. 3, 1992
§ 102(e) Date: Apr. 3, 1992
[87] PCT Pub. No.: WO91/19568
PCT Pub. Date: Dec. 26, 1991

[30] Foreign Application Priority Data

Jun. 12, 1990 [IT] Italy ................. 309 A/90

[51] Int. Cl.$^5$ .............................. B02C 19/00
[52] U.S. Cl. .................. 241/101.2; 241/200; 241/DIG. 38; 209/930; 210/400
[58] Field of Search ............. 241/DIG. 38, 101.2, 241/152.2, 60, 200; 209/930; 210/400, 198.1, 259, 173, 401

[56] References Cited

U.S. PATENT DOCUMENTS

| | | | |
|---|---|---|---|
| 2,004,753 | 6/1935 | Gredell | 241/152.2 X |
| 2,150,984 | 3/1939 | Near et al. | 241/200 X |
| 3,063,362 | 11/1962 | Guettler | |
| 3,604,179 | 9/1971 | Lund | 241/DIG. 38 X |
| 3,721,392 | 3/1973 | Burwell | 241/200 X |
| 3,891,105 | 6/1975 | Cerroni | 241/DIG. 38 X |
| 4,098,464 | 7/1978 | Niedner et al. | 241/DIG. 38 X |
| 4,427,157 | 1/1984 | Klein | 210/400 X |
| 4,578,185 | 3/1986 | Wilson et al. | 210/401 X |
| 4,836,100 | 6/1989 | Johnson et al. | 210/400 X |
| 4,961,862 | 10/1990 | Janecek | 210/401 X |

FOREIGN PATENT DOCUMENTS

| | | |
|---|---|---|
| 3009728 | 4/1981 | Fed. Rep. of Germany . |
| 3129820 | 2/1983 | Fed. Rep. of Germany . |
| 2034200 | 6/1980 | United Kingdom ............ 241/200 |
| 2148143 | 5/1985 | United Kingdom ............ 241/200 |

*Primary Examiner*—Mark Rosenbaum
*Assistant Examiner*—Frances Chen
*Attorney, Agent, or Firm*—Allegretti & Witcoff, Ltd.

[57] ABSTRACT

The invention concerns equipment for continuous chopping of municipal refuse and other solid wastes in general, consisting of: Section I: refuse collection subsystem, first compaction and conveyance to chopping section; Section II: subsystem for final compaction and chopping ribbon of refuse; Section III: subsystem for collection of chopped refuse and conveyance to landfill sites; Section IV: subsystem for collection and disposal of wastewaters. The equipment permits a ten-to fifteenfold reduction in the initial volume of the refuse, together with a chopping operation which allows this volume to be maintained and to obtain refuse of a sufficiently uniform size prior to transportation or to disposal in landfill sites.

5 Claims, 1 Drawing Sheet

EQUIPMENT FOR CONTINUOUS CHOPPING OF MUNICIPAL REFUSE AND OTHER SOLID WASTES IN GENERAL

BACKGROUND OF THE INVENTION

This invention pertains to equipment for the continuous chopping of municipal refuse and other solid wastes and more particularly for such equipment that includes cooperating apron conveyors for compacting and conveying the refuse, a chopping section for cutting up the refuse received from the two conveyors, cooperating means for conveying the chopped refuse to a disposal site, and means for collecting and treating the waste water from the refuse.

Large urban areas are, as well known, experiencing a crisis as regards the disposal of municipal refuse and special wastes in landfill sites, especially since the amount to be handled is continuously increasing, while it is becoming ever more difficult to find suitable sites for controlled tipping. Of fundamental importance in this regard is the fact that existing sites are reaching saturation. At the present time transport to landfill sites involves the movement of the total volume of refuse collected, generally in plastic bags and/or in bulk, mechanical compaction (using bulldozers, etc.) being performed only after tipping.

No specific studies appear to have been made on machinery or systems for reducing the volume of municipal refuse at its origin by means of mechanical equipment. All that has been done in this field has been to concentrate on finding solutions to the problem of treatment and separation of the various components of the refuse with a view to possible subsequent use, for instance, for energy production, recycling, salvaging, composting, disposal, etc.

The system described below thus concerns a mechanical solution based on an innovatory technique for compressing and chopping municipal refuse and solid wastes in general which permits a ten to fifteen fold reduction in initial volume, thus optimizing the use of available landfill sites, while ensuring the following advantages:

greater specific volume transported by the collection units (marked reduction in the number of trips made by waste-collection vehicles)

less space occupied on the landfill sites (thus assuring better performance and longer life)

better type of refuse tipped, since compression and chopping favour drying of the organic component of the refuse easier separation of the various components of the refuse after chopping for eventual transport to treatment and/or salvaging plants chopping of the refuse to optimized dimensions permits compaction on the landfill sites with good circulation of air and egress of methane and other possible gases from the tipped wastes the size of the chopped refuse of desired dimensions, ranging from a few millimeters up to the desired dimensions can be ensured by simple regulation of the system the type of system permits installation of the chopper equipment both in large fixed plants located in the area of the main users (landfill sites) and/or in collection centres (hospitals, barracks, schools, canteens, camping grounds, holiday villages, ships, harbours, etc.) and in small truck-mounted mobile plants for local chopping of collected refuse.

BRIEF DESCRIPTION OF THE DRAWING

There is shown in the attached drawing a presently preferred embodiment of the present invention.

SUMMARY

Figure 1:
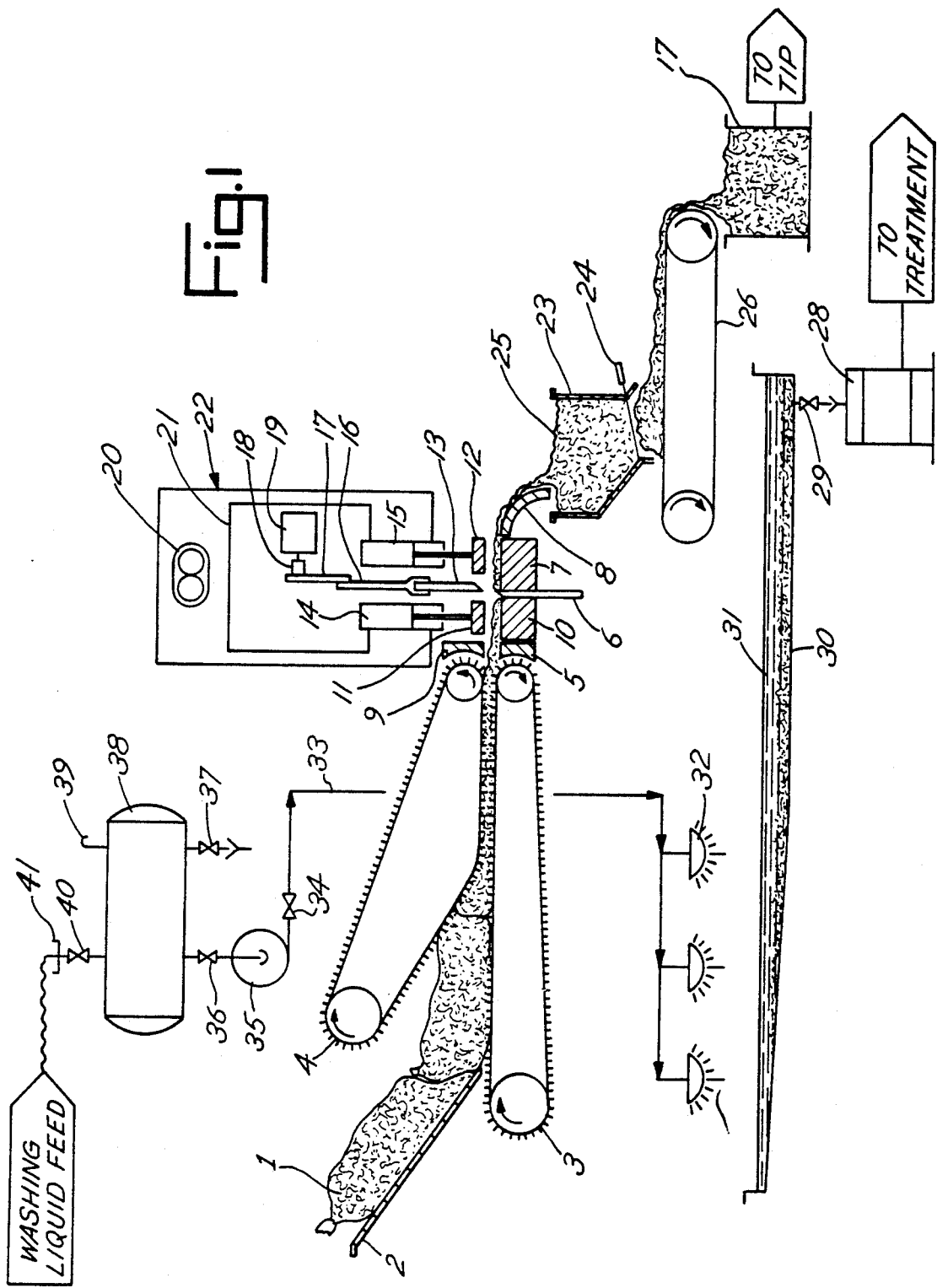

This invention comprises a chute for receiving bagged and/or bulk refuse, two cooperating apron conveyors for compacting and compressing the ribbon or stream of refuse received from the chute, a tank for collecting waste waters discharged from the refuse, means for storing and pumping liquid for the treatment of the waste waters, chopping means comprising at least one compactor and one cooperating compression table and a fixed and a mobile chopper for cutting the refuse, a surge bin receiving the chopped refuse, and a conveyor belt for receiving chopped refuse from the surge bin and transporting it to a disposal site.

The main components of the subsystems are indicated in FIG. 1 and in the "List of Main Components". Basically, these are as follows:

DETAILED DESCRIPTION OF THE INVENTION

Section I

This is composed of elements 2, 3, 4, 5 and 9. Here the bagged refuse and/or the bulk refuse is collected and conveyed by chute 2 to a pair of converging apron conveyors 3-4 which are sufficiently rigid and robust to ensure compaction, with reduction of volume of the refuse introduced, as it is dragged towards Section II of the machine, where it is chopped.

The municipal refuse 1, which is assumed to contain plastic bags in this phase, is dumped into chute 2 consisting of an inclined plane made of steel plate, supported by specially-built, robust steel framework. The chute can be the shape of a truncated pyramid and/or a hopper.

The advance of the bagged refuse 1 is ensured by the two apron conveyors 3 and 4 which are of the steelplate type or similar, complete with metal head and tail drums, all installed in a steel housing.

To permit initial compaction of the wastes, conveyor 4 is complete with a mechanism to ensure dynamic compaction of the bags of refuse introduced via chute 2, during their forward travel.

An appropriate sensor mechanism halts the Section in the event of the introduction of materials that are incompressible or so rigid that they could jeopardize the functionality of Section II. In this case, a check can be made of the container and the offending object can be removed immediately through specific inspection ports, openings, etc.

The lower conveyor 3, is constructed so as to permit the percolation of such waste liquids as may be produced during compaction and the removal thereof to tank 30 also located on the base of the housing.

Scrapers 5 and 9, which prevent the entrainment of refuse by conveyors 3 and 4, are positioned at the downstream end.

All the driving mechanism are located on suitable frames inside the housing.

Section II

This is composed of elements 10, 6, 7, 12, 13, 14, 16, 17, 18, 19, 15, 20, 21, 22 and 8.

Further compaction is provided by two hydraulic rams 14 and 15, while at the same time the ribbon of refuse is chopped transversally by means of mobile chopper 13 (on a rigid guide) and fixed chopper 6 capable of cutting any metal.

Chopper 13 is operated by crank mechanism 16-17 and motor 19 connected to eccentric 17 via joint 18. It should be noted that motor 19 can easily be replaced by other types of drive if the chopper is truckmounted.

The compression table 7 is mobile, in the vertical direction, to favour the cutting and expulsion of the chopped material downstream of section II on chute 8. The effective compaction and consequent chopping are based on the synchronized action of the following components:

hydraulic ram 14, via compactor 11 and compression table 10, compresses and holds the ribbon of refuse in the chopping position upstream of chopper 13 hydraulic ram 15, via compactor 12 and compression table 7, compresses and holds the ribbon of refuse downstream of chopper 13 chopper 13, simultaneously with tables 12 and 7 moves vertically ensuring that the ribbon of refuse is cut by fixed chopper 6 release and return of all abovementioned components to the upper "dead" position advance of ribbon of refuse coming from SECTION I, ensures the discharge of the chopped refuse into SECTION II via chute 8, and the subsequent positioning for cyclic repetition of the chopping phase.

Advance and chopping times can be set to achieve the desired size of the chopped material.

Movement of compactors 11 and 12 and of mobile section 7 is ensured by a hydraulic system 20, 21 and 22.

Section III

This is composed of elements 23, 24, 25, 26 and 27. Surge-bin 23, of suitable size, receives the chopped refuse 25 from SECTION II. By means of an appropriate gate and feeder 24 the chopped refuse is fed onto conveyor belt 26 which transports it to skip 27 or directly to the tip or to another point of disposal.

Section IV

This is composed of elements 41, 40, 39, 38, 37, 36, 35, 34, 33, 32, 31, 30, 29 and 28.

Bottom tank 30 collects any wastewaters and residual refuse 31. Nozzles 32 ensure washing and mixing with appropriate liquids stored in tank 38, complete with accessories 33, 34, 36, 37, 39 and 40, and pump 35. The ensuing mixture is conveyed by gravity or by pump to container 28 from whence it is sent to the treatment plant via motorized valve 29.

PLANT TYPE

The plant is built mainly of stainless and, in the standard version, it is installed in a reliable, robust, well-sealed metal housing, complete with all necessary safety devices; it is properly ventilated by means of an air and gas filtration unit.

The dimensions of the housing depend on the capacity and location of the plant (fixed, mobile, transportable, etc.).

The plant is complete with all necessary instrumentation, alarms and systems to prevent damage from acts of vandalism and the like, introduction of extraneous matter (stones, etc.) which could render it unserviceable.

The foregoing description does not give details of mechanical parts or of control and safety instrumentation or other auxiliary parts, such as slides, guides, joints, drives, etc., since these are considered to be of secondary importance for explaining the operation of the device as per this invention.

It is evident that the invention is not limited to the form of embodiment described and illustrated but that numerous variations and further improvements may be made without, however, moving outside the context of the invention.

LIST OF MAIN COMPONENTS

1-Bagged refuse and/or bulk refuse
2- Refuse chute to apron conveyor 3
3- Apron conveyor
4- Apron conveyor for compaction
5- Scraper
6- Fixed chopper
7- Vertically-mobile table synchronized with mobile chopper 13
8- Chopper refuse chute
9- Scraper
10-Fixed table with fixed chopper 6
11-Hydraulic compactor working on fixed table 10
12-Hydraulic compactor working on mobile table 7
13-Mobile chopper
14-Hydraulic ram actuating compactor 11
15-Hydraulic ram actuating compactor 12
16-Connecting rod actuating mobile chopper
17-Eccentric driving con-rod actuating mobile chopper 13
18-Chopper/motor or chopper/belt-drive joint
19-Motor
20-Gear pump for hydraulic system oil
21-Hydraulic oil lines
22-Hydraulic oil lines
23-Surge-bin for chopped refuse 25
24-Outlet gate and feeder on surge-bin for chopped refuse 25
25-Chopped refuse
26-Extractor belt for chopped refuse
27-Skip for chopped waste for disposal
28-Wastewater/washing-liquid container
29-Motorized valve on bottom tank
30-Bottom tank to collect washwaters used for such small amounts of refuse as may fall during the chopping operation
31-Washwater bath
32-Washing-liquid nozzles
33-Washing-liquid pipework
34-Pump-maintenance valve
35-Washing-liquid pump
36-Valve for washing-liquid tank maintenance
37-Drain-cock on washing-liquid tank
38-Washing-liquid tank
39-Air vent
40-Valve for washing-liquid tank maintenance
41-Quick-coupling for charging washing-liquid tank 38

We claim:

1. Equipment for the continuous chopping of municipal refuse and solid wastes comprising an elongated chute for receiving refuse carried on a frame means, two cooperating and converging apron conveyors adjacent the chute for carrying a ribbon of refuse forward while at the same time compressing and compacting the refuse, one apron conveyor being located below the other, a tank for collection and treatment of any waste waters from the refuse percolating through the lower apron conveyor, means for storing and pumping liquid for the treatment of the waste waters, chopping means comprising a compactor actuated by a hydraulic ram cooperating with a compression table and a fixed chopper and a mobile chopper for cutting the refuse received from the two apron conveyors, a surge bin to collect the chopped refuse, said surge bin including an outlet gate that is operable for emptying the surge bin , and a conveyor cooperating with the surge bin for receiving chopped refuse from the surge bin and transporting said chopped refuse to a disposal site.

2. Equipment as in claim 1 including a head end scraper associated with each apron conveyor for removing refuse from the apron conveyors.

3. Equipment as in claim 1 including a motor drive coupled to an eccentric mechanism for actuating the mobile chopper with respect to the fixed chopper.

4. Equipment as in claim 1 including two compactors, one on each side of the mobile chopper, and two compression tables, one on each side of the fixed chopper, each compactor cooperating with a compression table for compressing and holding the ribbon of refuse to facilitate chopping of the refuse.

5. Equipment as in claim 4 wherein one of the compression tables is horizontally disposed and is vertically mobile with respect to an associated compactor.

* * * * *